United States Patent
Mounetou et al.

(10) Patent No.: US 7,715,993 B2
(45) Date of Patent: May 11, 2010

(54) METHOD FOR ESTIMATING THE PUMPING TORQUE OF AN ENGINE

(75) Inventors: Christophe Mounetou, Malakoff (FR); Jerome Cruchet, Paray Vielle Poste (FR)

(73) Assignee: Renault s.a.s., Boulogne Billancourt (FR)

( * ) Notice: Subject to any disclaimer, the term of this patent is extended or adjusted under 35 U.S.C. 154(b) by 226 days.

(21) Appl. No.: 11/718,182

(22) PCT Filed: Oct. 20, 2005

(86) PCT No.: PCT/FR2005/050874

§ 371 (c)(1),
(2), (4) Date: Oct. 30, 2007

(87) PCT Pub. No.: WO2006/045972

PCT Pub. Date: May 4, 2006

(65) Prior Publication Data

US 2009/0164144 A1    Jun. 25, 2009

(30) Foreign Application Priority Data

Oct. 27, 2004    (FR)    .................... 0411473

(51) Int. Cl.
  *G01L 1/00*    (2006.01)
  *G01M 15/00*    (2006.01)

(52) U.S. Cl. ..................... 702/41; 73/114.15

(58) Field of Classification Search .................... 702/41, 702/138, 140, 142, 33, 44, 47, 127, 182–184; 73/114.01, 114.15, 114.25, 114.32, 114.33, 73/114.37, 114.61, 114.76; 123/22, 188.1, 123/250, 253, 294, 429
See application file for complete search history.

(56) References Cited

U.S. PATENT DOCUMENTS

| 5,205,152 | A  | * | 4/1993 | Clarke et al. ...................... 73/9 |
| 6,226,585 | B1 | * | 5/2001 | Cullen .......................... 701/54 |
| 6,553,958 | B1 | * | 4/2003 | Kolmanovsky et al. ..... 123/295 |
| 2004/0044461 | A1 |  | 3/2004 | Ueda |

FOREIGN PATENT DOCUMENTS

| EP | 1 347 163 | 9/2003 |
| EP | 1347163 A1 * | 9/2003 |

OTHER PUBLICATIONS

English Translation of EP 1347163, Sep. 2003.*
* cited by examiner

*Primary Examiner*—Michael P. Nghiem
*Assistant Examiner*—Toan M Le
(74) *Attorney, Agent, or Firm*—Oblon, Spivak, McClelland Maier & Neustadt, L.L.P.

(57) ABSTRACT

A method for estimating pump torque of a computer-controlled fuel injection heat engine for a motor vehicle. The method determines the pumping torque in a for of a relative pumping torque representative for total pumping torque contribution of an intake and exhaust valve system, wherein the relative pumping torque is determined by a relation factoring in engine cubic capacity, a pressure difference, an exhaust pressure differential estimation due to the presence of the exhaust valves, and an intake pressure differential estimation due to the presence of the intake valves.

11 Claims, 5 Drawing Sheets

METHOD FOR ESTIMATING THE PUMPING TORQUE OF AN ENGINE

FIELD OF THE INVENTION

The present invention relates to a method of estimating the pumping torque of an internal combustion engine for a motor vehicle, especially a vehicle equipped with a diesel engine with electronically controlled direct infection and with a particulate filter in the exhaust line and an intake flap in the intake line.

BACKGROUND OF THE INVENTION

The engine pumping torque that is to say the loss relative to the engine torque (or engine resist torque) due to the pumping work of the piston(s) during the intake and exhaust phases, is one of the quantities that have to be known to the electronic engine control units that determine the engine control laws based on a set of parameters characterizing the engine and also on various quantity measurements or estimates.

Patent application EP 1 347 163 discloses a method of estimating the engine pumping torque that takes into account the presence of a particulate filter in the engine's exhaust line. This method assumes in particular at the pressure upstream of the turbine is known, which pressure is usually measured by means of a sensor. However, such a sensor is not always available, thereby making the estimation described unusable.

Moreover, even in the presence of such a sensor, there may be difficulties or uncertainties in measuring this pressure. In this case, estimating the pumping torque according to the method of document EP 1 347 163 proves to be inaccurate or unusable.

SUMMARY OF THE INVENTION

The object of the invention is to propose a method of estimating the engine pumping torque that can be used even in the absence of a measurement or estimate of the pressure upstream of the turbine and that takes into account the presence of intake or exhaust valving means, such as a particulate filter or an intake flap.

For this purpose, the subject of the invention is a method of estimating the pumping torque of an internal combustion engine for a motor vehicle equipped with fuel injection controlled by an electronic computer, said method being noteworthy in that it consists in determining the pumping torque in the form of a relative pumping torque $CMI_{bp\_rel}$ representative of the contribution to the total pumping torque of the intake and exhaust valving means, the relative pumping torque $CMI_{bp\_rel}$ being determined by the equation:

$$CMI_{bp\_rel} = \frac{\Delta V \times \Delta P_{rel}}{4\pi}$$

in which $\Delta V$ is the swept volume of the engine and $\Delta P_{rel}$ is the pressure difference, the sum of $\Delta P_{erh}$ and $\Delta P_{adm}$, $\Delta P_{ech}$ being an estimate of the exhaust pressure differential due to the presence of exhaust valving means and $\Delta P_{adm}$ being an estimate of the intake pressure differential due to the presence of intake valving means.

The pressure difference $\Delta P_{rel}$ comprises on the one hand, the estimate of the pressure differential on the exhaust side $\Delta P_{ech}$ and, on the other hand, the estimate of the pressure differential on the intake side A dm. The pressure differentials $\Delta P_{ech}$ and $\Delta P_{adm}$ correspond to the contribution by the exhaust and intake valving means, respectively, to the pressure difference $\Delta P_{rel}$, and therefore to their respective contribution to the relative pumping torque Consequently, these pressure differentials $\Delta P_{ech}$ and $\Delta P_{adm}$ are zero in the absence of exhaust and intake valving means respectively.

The pressure difference $\Delta P_{rel}$ thus determined can be used to determine the relative pumping torque of the engine representative of the contribution of the intake and exhaust valving means to the total pumping torque.

According to one particular embodiment, the pressure difference $\Delta P_{rel}$ estimated from pressure or temperature measurements carried out in the exhaust line and in the intake line and from several parameters such as the intake air mass flow rate $Q_a$, the injected fuel flow rate $Q_c$; the engine speed N and the atmosphere pressure $P_{atm}$.

When the exhaust line of the engine includes at least one exhaust valving means, said exhaust pressure differential $\Delta P_{ech}$ is preferably determined as the product of a coefficient $\eta_{ech}$ and the difference between the measured value of the pressure $P_{amf}$ upstream of said exhaust valving means and an estimate of the exhaust pressure $P_{amf\_vide}$ in the absence of said exhaust valving means, $$\Delta P_{ech} = \eta_{ech}(P_{awf} - P_{amf\_vide}).$$

Likewise, when the intake line of the engine includes intake valving means, said intake pressure differential $\Delta P_{adm}$ is preferably determined as the product of a coefficient $\eta_{adm}$ and the difference between the measured value of the pressure $P_{sural}$ upstream of said intake valving means and an estimate of the intake pressure $P_{sural\_sv}$ in the absence of said intake valving means, $$\Delta P_{adm} = \eta_{adm}(P_{sural} - P_{sural\_sv}).$$

The method according to the invention may furthermore include one or more of the following advantageous features:
  said pressure difference $\Delta P_{rel}$ is temporally filtered and the time constant used for this temporal filtering is preferably a function of the engine speed;
  the estimate of the exhaust pressure in the absence of said exhaust valving means is determined as a function of the mass flow rate of air injected into the intake line;
  the estimate of the exhaust pressure in the absence of said exhaust valving means is corrected according to the temperature measured upstream of said exhaust valving means;
  the estimate of the intake pressure in the absence of said intake valving means is determined as a function of the total amount of injected fuel and of the engine speed; and
  the estimate of the intake pressure in the absence of said intake valving means is corrected according to the atmospheric pressure.

BRIEF DESCRIPTION OF THE DRAWINGS

Other features and advantages of the invention will become apparent through the detailed description that follows and with reference to the figures in which.

DETAILED DESCRIPTION OF THE INVENTION

Figure 1:
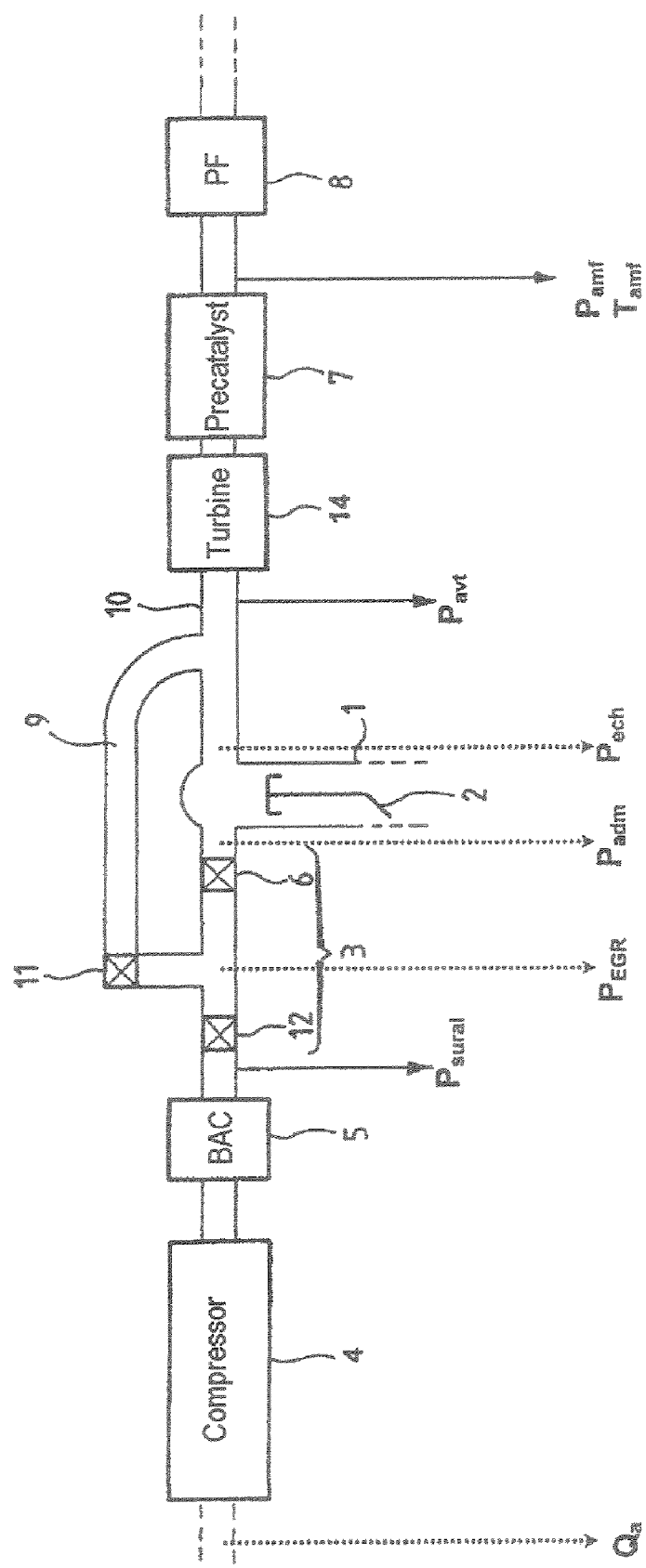
FIG. 1 is a schematic representation of an example of an intake/exhaust line with a particulate filter associated with a diesel engine.

FIG. 1 illustrates schematically an example of an intake/exhaust line of a motor vehicle engine provided with a particulate filter 8 and an exhaust gas recirculation circuit 9 and shows one of the cylinders 1 with a piston 2 in communication with the air intake manifold 3, or intake distributor, which is generally provided with a turbocompressor in the case of a diesel engine consisting of a compressor 4 upstream of the engine and a turbine 14 downstream in the exhaust line 10 Optionally associated with this turbocompressor is a boost air cooling circuit 5 intended to reduce the temperature of the air that has to be taken into the cylinders. At the inlet of each cylinder may be placed what is called a "swirl" flap 6, intended to vary the quantity of air entering the cylinder. A precatalyst 7 is mounted in the exhaust line 10, after the turbine 14 and before a particulate filter 8.

To improve the pollution control of the direct fuel injection engine, controlled by an electronic computer a circuit 9 is created for recirculating some of the exhaust gas into the intake manifold 3, obtained by means of an EGR (exhaust gas recirculation) valve 11. In addition, an intake flap 12 is placed upstream of the engine in order to reduce, as required, the flow of fresh air into the intake manifold 3. The particulate filter 8 is intended to arrest the soot particles from the burned gases, in order to comply with the pollution control standards, but this may constitute exhaust backpressure that increases the engine losses and degrades its efficiency.

The various pressure and temperatures considered within the context of this invention are denoted, respectively:

$P_{sural}$: pressure upstream of the manifold 3;
$P_{EGP}$: pressure at the recirculation point located at the outlet of the EGR valve 11;
$P_{adm}$: pressure upstream of the cylinder 1 and downstream of the manifold 3;
$P_{ech}$: pressure downstream of the cylinder 1 and upstream of the inlet point of the recirculation circuit 9;
$P_{avt}$: pressure upstream of the turbine 14;
$P_{amf}$: pressure upstream of the particulate filter 8; and
$T_{amf}$: temperature upstream of the particulate filter 8

Figure 2:
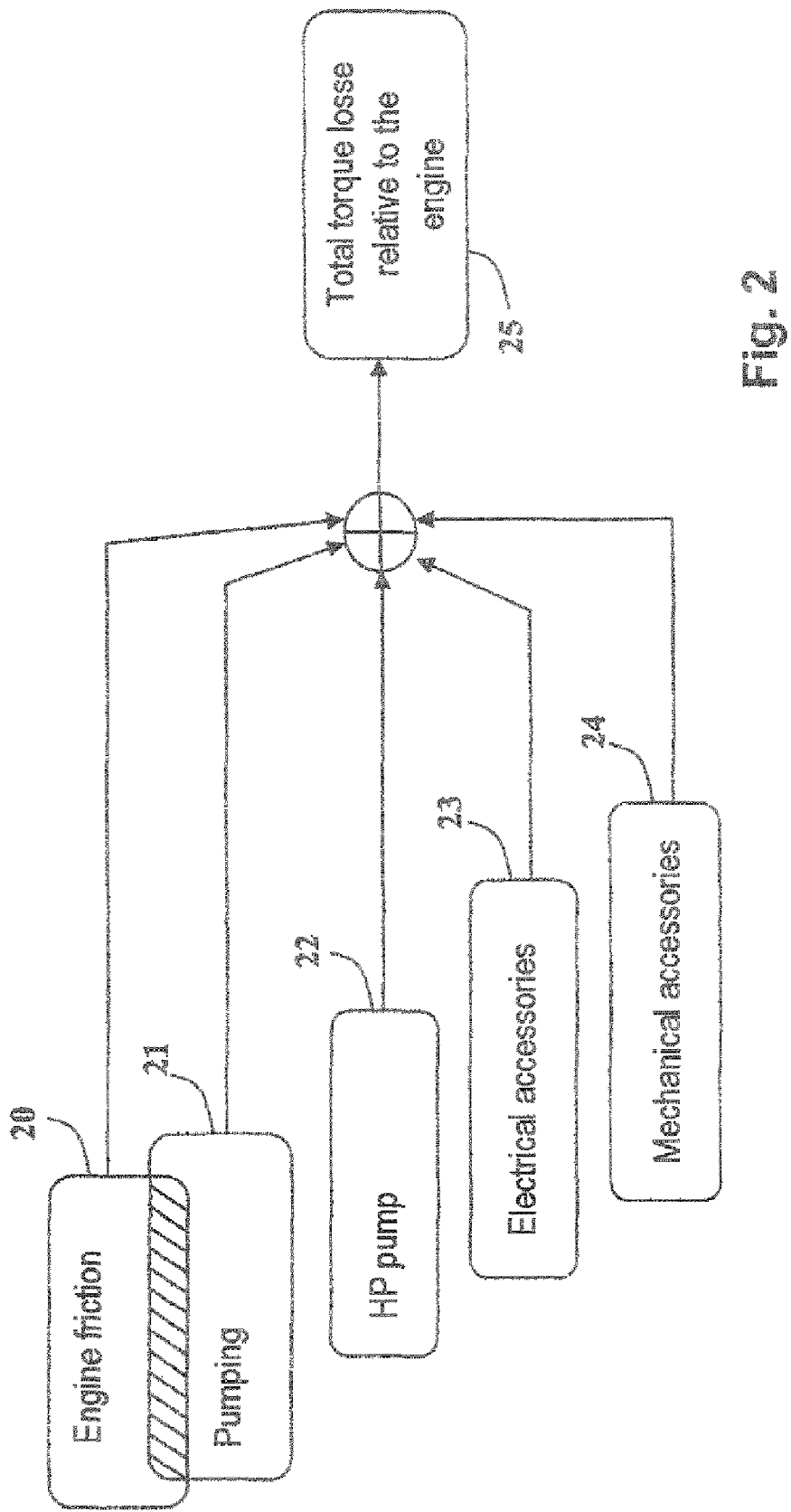
FIG. 2 is a schematic representation of the various resistive torques that oppose the torque demanded by the driver.

FIG. 2 is a schematic representation of the various factors each causing a loss of engine torque or engine resistive torque. The difference between a predetermined torque demand by the driver and the effective engine torque output from the crankshaft derives from all the resistive torques, namely:

the resistive torques 23 generated by electrical consumers, such as the indicating lamps, the windshield wipers, etc.;
the resistive torques 24 generated by mechanical consumers, such as the air conditioning unit or the power steering pump;
the resistive torque 22 generated by the high-pressure fuel injection pump;
the mean friction torque 20 in the engine; and
the pumping torque $CMI_{bp}$ 21 of the engine corresponding cumulatively to the pumping $CMI_{base}$ due to the working of the engine pistons (called here natural pumping of the engine or base pumping $CMI_{base}$), to the pumping $CMI_{adm}$ due to the various valving means or other elements present in the intake line (called here intake pumping $CMI_{adm}$) and to the pumping $CMI_{ech}$ due to the various valving means, filters or other elements present in the exhaust line (called here exhaust pumping $CMI_{ech}$), including the pumping due to the particulate filter.

The total engine resistive torque 25 is therefore the sum of these resistive torques 20 to 24. In practice, all these resistive torques are compensated for so that, for the same demand by the driver, that is to say for the same position of the gas pedal, the feel is the same, that is to say that the effective engine torque CME is the same, whatever the losses with respect to the engine torque. This results, for an engine cycle, in a mean indicated torque in the high-pressure loop $CMI_{hp}$ corresponding to a total quantity of injected fuel $Q_c$. The effective engine torque CME is estimated from the mean indicated torque in the high-pressure loop $CMI_{hp}$ and from the torque losses. This estimate of the effective engine torque CME is transmitted to the automatic gearbox, antiskid-system or distance-control computers for example, which may consequently correct the demand by the driver. The transparency to the driver of the action of these computers depends on the subtlety in estimating the effective motor torque CME.

Figure 3:
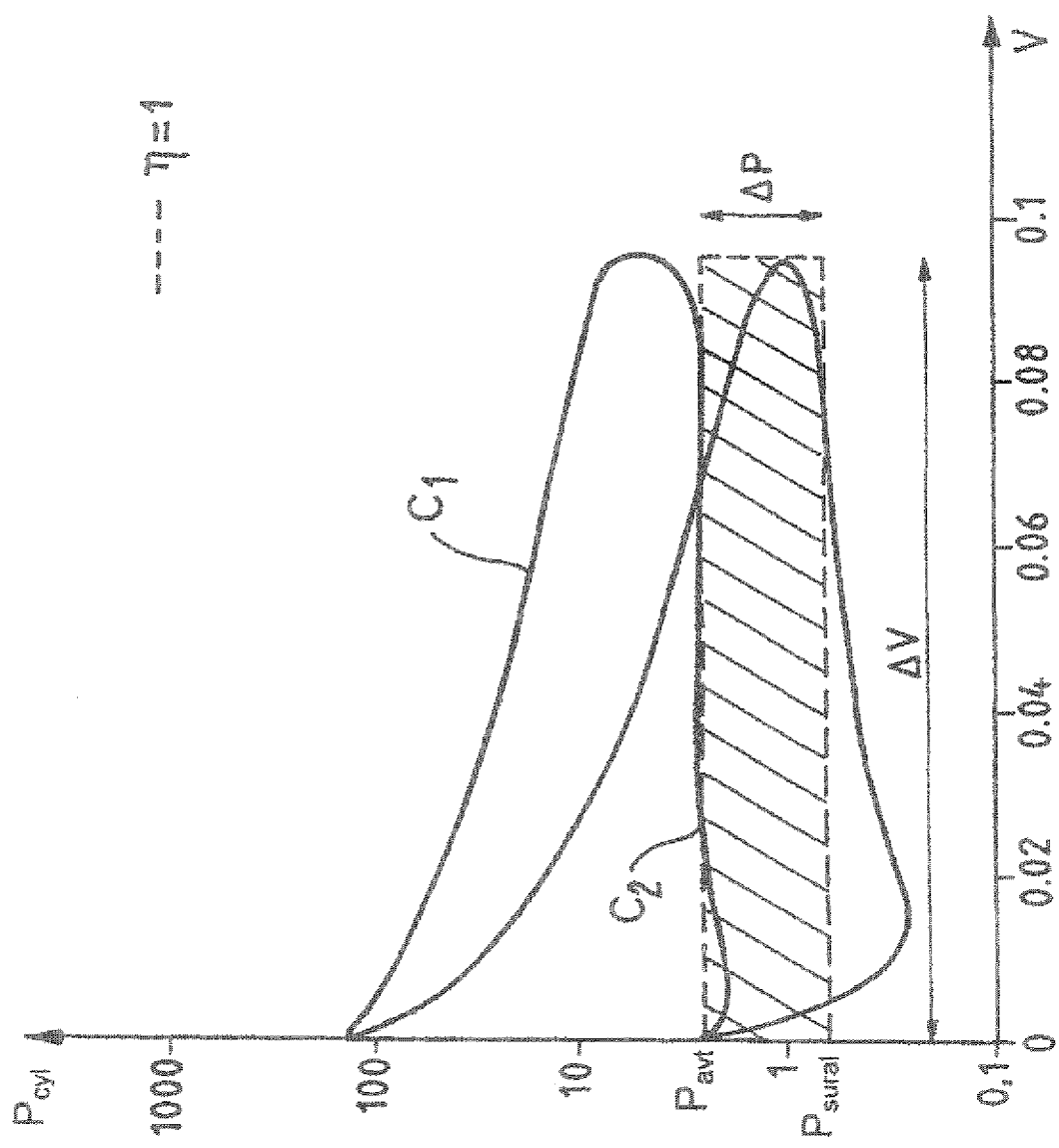
FIG. 3 is a plot showing the variations in the pressure in a cylinder as a function of the variations in its volume.

FIG. 3 shows the variations in the pressure $P_{cyl}$ in a cylinder 1, expressed in bar on a logarithmic scale, as a function of its internal volume variation, expressed in m³, during displacement of the piston in a four-stroke engine. Part $C_1$ of the curve or high-pressure loop lying essentially above the straight line $P_{cyl}=P_{avt}$, corresponds to the combustion and compression phases. Part $C_2$ of the curve or low-pressure loop, lying essentially below the straight line $P_{cyl}=P_{avt}$, corresponds to the intake and exhaust phases. The area defined by this part $C_2$ of the curve represents the mean indicated pumping torque in the low-pressure loop $CMI_{bp}$ for one engine cycle.

To a first rough approximation, the mean indicated pumping torque $CMI_{bp}$ is:

$$CMI_{bp} = \eta \times \frac{\Delta V \times \Delta P}{4\pi} \quad (1)$$

where: $\Delta P$ is the pressure difference between the pressure $P_{sural}$ at the inlet of the manifold and the pressure $P_{avt}$ upstream of the turbine in each cylinder;

$\Delta V$ is the total volume of the engine, determined for n cylinders of the engine; and $\eta=1$.

The product $\Delta V \times \Delta P$ is divided here by $4\pi$, corresponding to two engine revolutions and optionally multiplied by a scales factor, which depends on the units with which the electronic computer works or with those used for the various measurements.

This first approximation corresponds to the hatched rectangular area in FIG. 3. In fact, the mean indicated pumping torque $CMI_{bp}$ may either be smaller or larger, depending on the shape of curve $C_2$ and the area that it defines. A correction may be made to this first approximation by means of a form factor, replacing $\eta$ in equation (1) with a multiplicative coefficient, generally different from 1. According to patent application EP 1 347 463, this coefficient is for example a function of $\Delta P$, the engine speed N and the pressure $P_{sural}$ at the inlet of the manifold.

Equation (1) given above corresponds to the total or absolute pumping torque $CMI_{bp}$. It comprises the natural pumping torque $CMI_{base}$ of the engine, the intake pumping torque $CMI_{adm}$ and the exhaust pumping torque $CMI_{ech}$:

$$CMI_{bp} = CMI_{base} + CMI_{adm} + CMI_{ech}$$
$$= \eta \times \frac{\Delta V \times \Delta P}{4\pi} = \eta \times \frac{\Delta V \times (P_{sural} - P_{avt})}{4\pi}.$$

Ideally, these are the pressures $P_{adm}$ and $P_{ech}$ (see FIG. 1) measured as close as possible to the cylinder 1 that is to say at the intake and exhaust valves of the cylinder 1, which pressures will be needed for calculating the overall pumping torque of the engine. In general, the measured pressures $P_{sural}$ and Pave are instead used.

However, in the absence of a sensor for measuring the pressure $P_{avt}$ upstream of the turbine or when it is difficult or impossible to obtain a reliable and accurate measurement of the pressure upstream of the turbine, it is not possible to determine the natural pumping torque $CMI_{base}$ of the engine. Moreover, the measured exhaust pressure $P_{ech}$ may also be unknown from the engine control module. It is then practically impossible to estimate the total pumping torque. In such cases, instead of the total pumping torque, the method according to the invention determines a relative pumping torque $CMI_{bp\_rel}$ defined as follows:

$$CMI_{bp\_rel} = CMI_{bp} - CMI_{base} = CMI_{adm} + CMI_{ech}.$$

Moreover, as the hatched area in FIG. 2 shows, which represents the overlap between the elements 20 and 21, it is difficult to estimate the resistive torque due to the engine friction and the pumping torque without counting the base pumping torque twice, which has already been taken into account in estimating the engine friction. Estimating a relative pumping torque therefore makes it possible to overcome this difficulty and proves to be sufficient for correcting the driver torque demand and for obtaining an effective engine torque independent of the losses due to the intake and exhaust valving means.

The method of estimating the pumping torque according to the invention will now be described in greater detail with reference to FIGS. 4 and 5.

Figure 4:
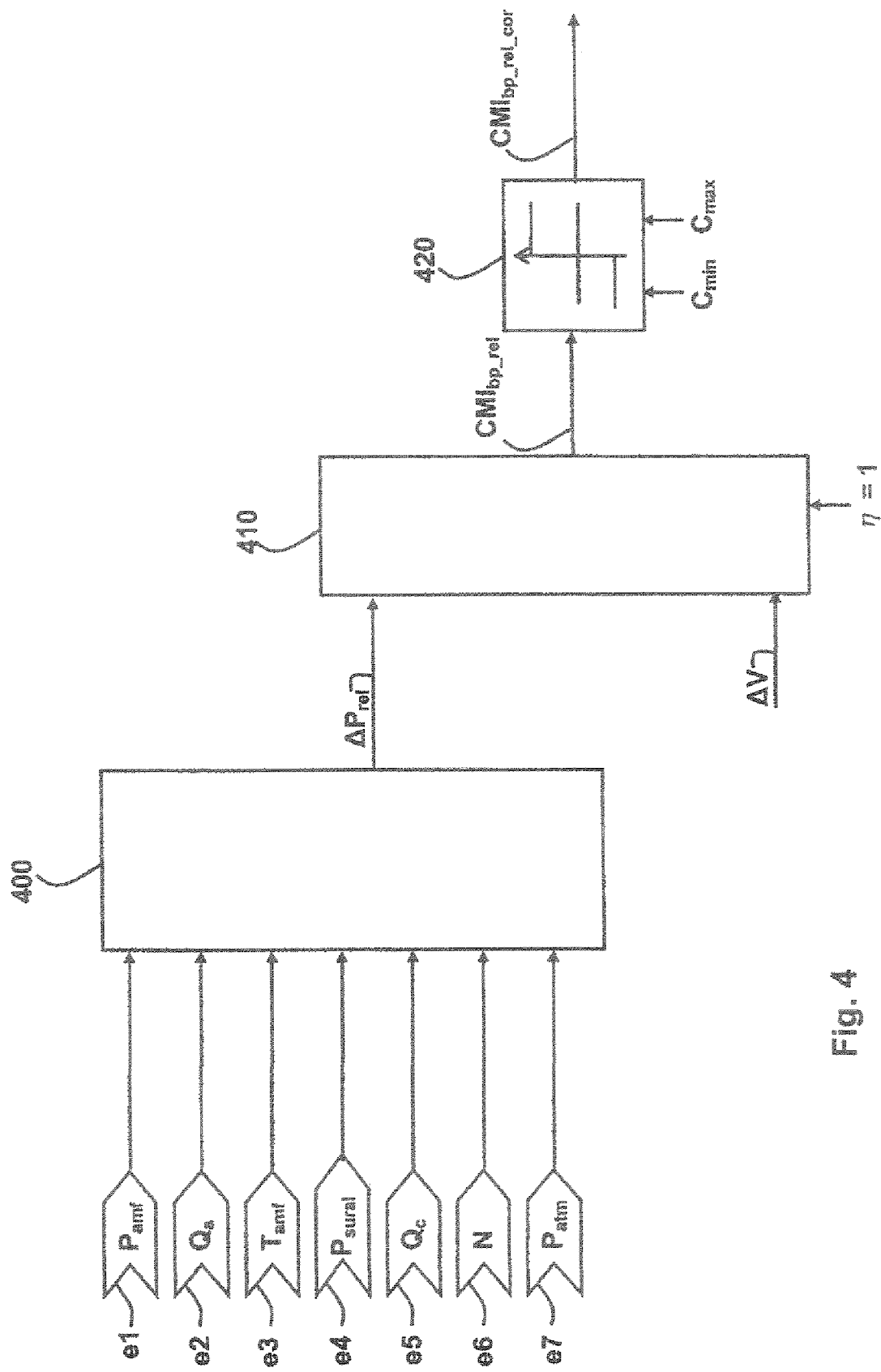
FIG. 4 is a general diagram of the various steps of the method of estimating the relative pumping torque according to the invention.

FIG. 4 is a general diagram of the various steps of the method of estimating the pumping torque according to the invention. In a first step 400, a pressure difference $\Delta P_{rel}$ is determined from several variables e1 to e7, which are, respectively:

e1: the pressure $P_{amf}$ measured upstream of the particulate filter 3;

e2: the air mass flow rate $Q_a$ measured upstream of the compressor 4;

e3: the temperature $T_{amf}$ measured upstream of the particulate filter 8;

e4: the pressure $P_{sural}$ measured upstream of the intake manifold 3;

e5: the injected fuel rate $Q_c$, in the form of a setpoint value delivered to an injection control module;

e6: the engine speed N as measured; and e7 the atmospheric pressure $P_{atm}$ as measured.

Figure 5:
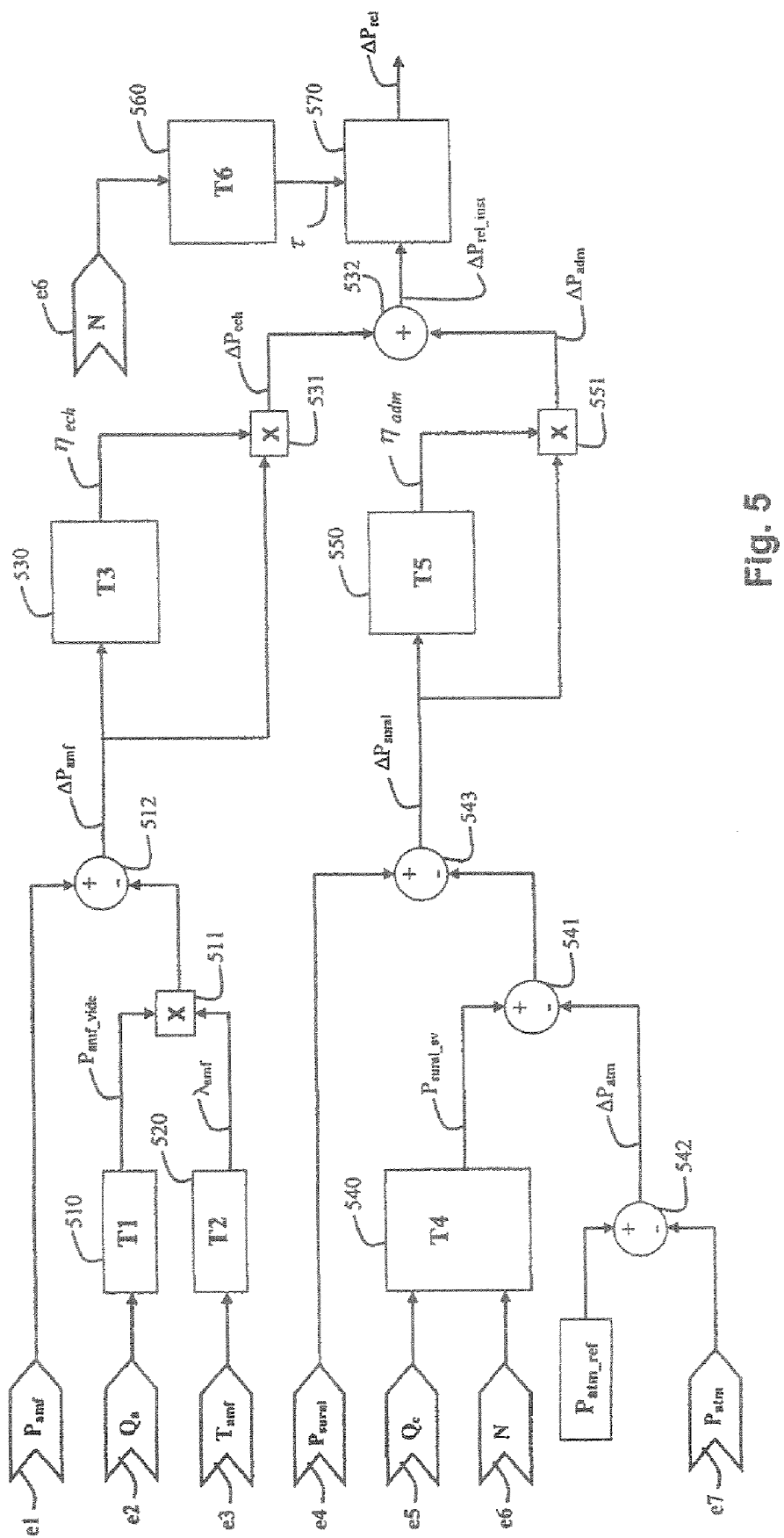
FIG. 5 is a sub-scheme of the diagram of FIG. 4 corresponding to the estimation of the parameter $\Delta P_{rel}$.

The method of calculating the pressure difference $\Delta P_{rel}$ from the variables e1 to e7 is illustrated by FIG. 5 is will be described later. At step 410, the pumping torque in the form of a relative pumping torque $CMI_{bp\_rel}$ is calculated from this pressure difference $\Delta P_{rel}$ and the swept volume $\Delta V$ according to equation (1), already described for the estimate of the overall pumping torque, in which the form factor was set to 1.

$$CMI_{bp\_rel} = \frac{\Delta V \times \Delta P_{rel}}{4\pi}.$$

The form factor $\eta$ here is set to 1 insofar as the form factor is taken into consideration when estimating the pressure difference $\Delta P_{rel}$ determined at step 400 as will be described later.

Finally, the corrected value of the relative pumping torque $CMI_{bp\_rel\_cor}$ is determined at step 420 by 1 ml limiting the value of the relative pumping torque $CMI_{bp\_rel}$ between a minimum relative pumping torque value $C_{min}$ and a maximum relative pumping torque value $C_{max}$.

The method of estimating the pressure difference $\Delta P_{rel}$ will now be described with reference to figure S.

An estimate of the pressure $P_{amf\_vide}$ upstream of the particulate filter when the latter is empty is determined at step 510 as a function of the air mass flow rate $Q_a$ measured upstream of the compressor 4 and by means of a one-dimensional table T1. This is in fact an estimate of the pressure $P_{ech}$ that would be at the point of measurement of the pressure $P_{amf}$ when a particulate filter is empty. Optionally, the value $P_{amf\_vide}$ thus determined is corrected according to the temperature by multiplying, at step 511, the value $P_{amf\_vide}$ obtained at step 510 by a correction coefficient $\lambda_{amf}$. This correction coefficient is determined at step 520, as a function of the temperature $T_{amf}$ measured upstream of the particulate filter and by means of a one-dimensional table T2. Next, at step 512, the difference between the pressure $P_{amf}$ measured upstream of the particulate filter and the pressure determined at step 510 or 511 is effected in order to obtain a pressure difference $\Delta P_{amf}$ representative of the contribution of the particulate filter to the pressure difference $\Delta P_{rel}$. This pressure difference $\Delta P_{amf}$ is preferably corrected at step 531 by a multiplicative coefficient $\eta_{ech}$, which is itself determined at step 530 according to the pressure difference $\Delta P_{amf}$ and by means of a one-dimensional table T3. After step 531, what is obtained is an exhaust pressure difference $\Delta P_{ech}$ or exhaust pressure differential due to the presence of the exhaust valving means, in this case, in this embodiment, due to the particulate filter.

At the same time as steps 510 to 531 for determining an exhaust pressure differential $\Delta P_{ech}$, and independently of these steps, an intake pressure differential $\Delta P_{adm}$ is determined at steps 540 to 551.

Thus, an estimate of the boost pressure in the absence of intake valving means $P_{sural\_sv}$ is determined at step 540 from the rate $Q_c$ of fuel Injected into each cylinder, from the engine speed N and by means of a two-dimensional table T4. This is in fact an estimate of the pressure $P_{adm}$ that would be at the inlet of the cylinder 1 in the absence (or, which comes to the same thing, in the event of complete opening) of the intake valving means, namely the intake flap 12, the EGR valve 11 and the swirl flap 6. The boost pressure in the absence of intake valving means $P_{sural\_sv}$ is preferably corrected at step 541 by the difference effected at step 542 between the current atmospheric pressure and a reference atmospheric pressure $P_{atm\_ref}$ for which the table T4 has been determined. Next, at step 543, the difference between the pressure $P_{sural}$ and the pressure determined at step 540 or 541 is effected in order to obtain a pressure difference $\Delta P_{sural}$ representative of the contribution of the intake valving means to the pressure difference $\Delta P_{rel}$. This pressure difference $\Delta P_{sural}$ is preferably corrected at step 551 by a multiplicative coefficient $\eta_{adm}$, which is itself determined at step 550 from the pressure difference $\Delta P_{sural}$ and by means of a one-dimensional table T5. What is obtained after step 551 is an intake pressure difference $\Delta P_{adm}$ or intake pressure differential due to the presence of the intake valving means.

An instantaneous pressure difference $\Delta P_{rel\_inst}$ is determined at step 532 from the exhaust pressure differential $\Delta P_{ech}$ and from the intake pressure differential $\Delta P_{adm}$ by effecting the sum of the exhaust pressure differential $\Delta P_{ech}$ and the intake pressure differential $\Delta P_{adm}$. This instantaneous pressure difference $\Delta P_{rel\_inst}$ is preferably filtered at step 570 by means of a temporal filter in order to generate the pressure difference $\Delta P_{rel}$ that will be used at step 410 for determining the relative engine pumping torque. The temporal filter used at step 570 is for example a first-order filter, the time constant $\tau$ of which is determined at step 560 as a function of the engine speed N. This determination is preferably carried out by means of a one-dimensional table T6. Preferably, the time constant will be longer the lower the engine speed.

The various tables T1 to T6 used in implementing the method according to the invention result from measurements made on a test bed and using additional sensors to those present in mass-produced vehicles. Using additional sensors, it is possible to construct each table by assigning to it, for a given number of values of the input variables) of this table, the measured value obtained each time for the output variable of this table. The prior construction of these tables, which therefore model the relationships between their respective input and output parameters, and their subsequent use in mass-produced vehicles as a replacement for additional sensors, therefore allow savings to be made by not having these additional sensors and avoids having to perform tedious calculations or modeling operations on these vehicles.

To construct the tables T3 and T5, which generate a form factor, also requires a determination, by calculation, of the form factor from a curve obtained by measurement. This measurement curve is for example in the form illustrated in FIG. 3, showing the curve of variation of the pressure $P_{cyl}$ in the cylinder as a function of the volume V. The form factor is deduced, in the case for example of determining the form factor $\eta$ corresponding to equation (1), by calculating the value of $\eta$ from equation (1) into which the value of $CMI_{bp}$, determined by calculation as being the area of curve $C_2$, and the measured value obtained for $\Delta P$ and the known value of $\Delta V$ have been inserted. This determination example is readily transposed to tables T3 and T5 by determining by measurement, the curve of variation of the pressure at the various relevant points in the exhaust/intake line.

The invention claimed is:

1. A method of estimating pumping torque of an internal combustion engine for a motor vehicle including fuel injection controlled by an electronic computer, the method comprising:

determining the pumping torque in a form of a relative pumping torque $CMI_{bp\_rel}$ representative of a contribution to total pumping torque of intake and exhaust valving devices, the relative pumping torque $CMI_{bp\_rel}$ being determined by:

$$CMI_{bp\_rel} = \frac{\Delta V \times \Delta P_{rel}}{4\pi}$$

in which $\Delta V$ is swept volume of the engine, and a pressure difference $\Delta P_{rel}$ is equal to the sum of $\Delta P_{ech}$ and $\Delta P_{adm}$, $\Delta P_{ech}$ being an estimate of the exhaust pressure differential due to presence of the exhaust valving device and $\Delta P_{adm}$ being an estimate of the intake pressure differential due to presence of the intake valving device.

2. The method as claimed in claim 1, wherein the pressure difference $\Delta P_{rel}$ is temporally filtered.

3. The method as claimed in claim 2, wherein a time constant of the temporal filtering is a function of the engine speed.

4. The method as claimed in claim 1, adapted for an engine with an exhaust line including at least one exhaust valving device, the exhaust pressure differential $\Delta P_{ech}$ being determined as the product of a coefficient $\eta_{ech}$ and the difference between a measured value of pressure $P_{amf}$ upstream of the exhaust valving device and an estimate of exhaust pressure $P_{amf\_vide}$ in absence of the exhaust valving device, $$\Delta P_{ech} = \eta_{ech}(P_{amf} - P_{amf\_vide}).$$

5. The method as claimed in claim 4, wherein the exhaust valving device includes a particulate filter.

6. The method as claimed in claim 4, wherein the estimate of the exhaust pressure ($P_{amf\_vide}$) in the absence of the exhaust valving device is determined as a function of a mass flow rate of air injected into the intake line.

7. The method as claimed in claim 4, wherein the estimate of the exhaust pressure ($P_{amf\_vide}$) in the absence of the exhaust valving device is corrected according to a temperature measured upstream of the exhaust valving device.

8. The method as claimed in claim 1, adapted for an engine with an intake line including the intake valving device, an intake pressure differential $\Delta P_{adm}$ being determined as the product of a coefficient $\eta_{adm}$ and the difference between the measured value of the pressure $P_{sural}$ upstream of the intake valving device and an estimate of the intake pressure $P_{sural\_sv}$ in the absence of the intake valving device, $$\Delta P_{adm} = \eta_{adm}(P_{sural} - P_{sural\_sv}).$$

9. The method as claimed in claim 8, wherein the intake valving device comprises an intake flap, a swirl flap, or an EGR valve.

10. The method as claimed in claim 8, wherein the estimate of the intake pressure ($P_{sural\_sv}$) in the absence of the intake valving device is determined as a function of a total amount of injected fuel and of engine speed.

11. The method as claimed in claim 8, wherein the estimate of the intake pressure in the absence of the intake valving device is corrected according to atmospheric pressure.

\* \* \* \* \*